May 21, 1940. P. W. DEMPSEY 2,201,576
METHOD OF MAKING GASKETS
Original Filed Nov. 22, 1935 3 Sheets-Sheet 1
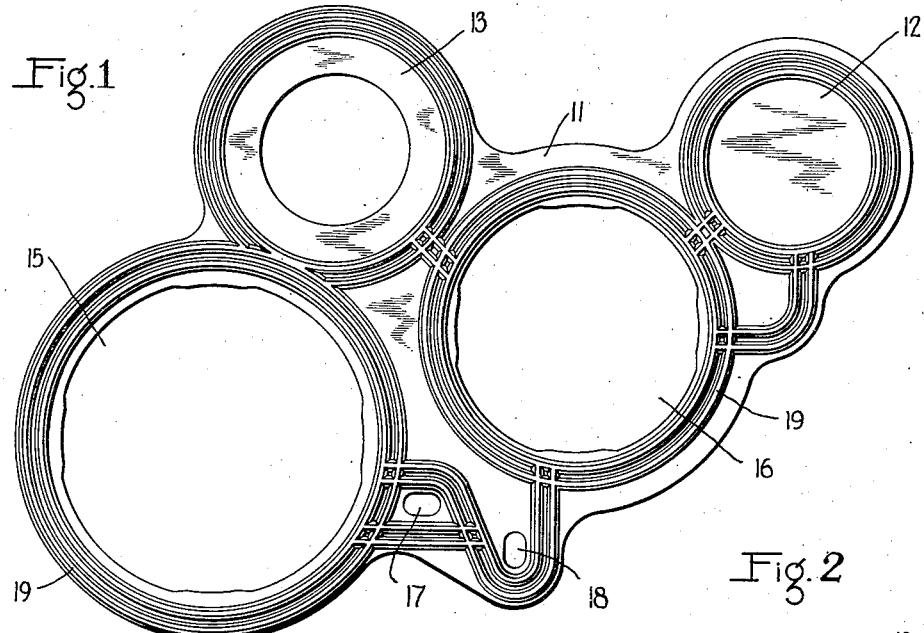
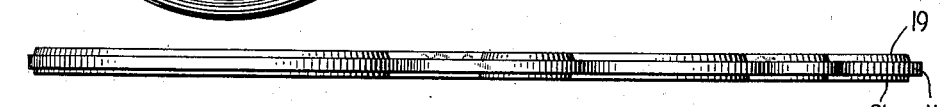
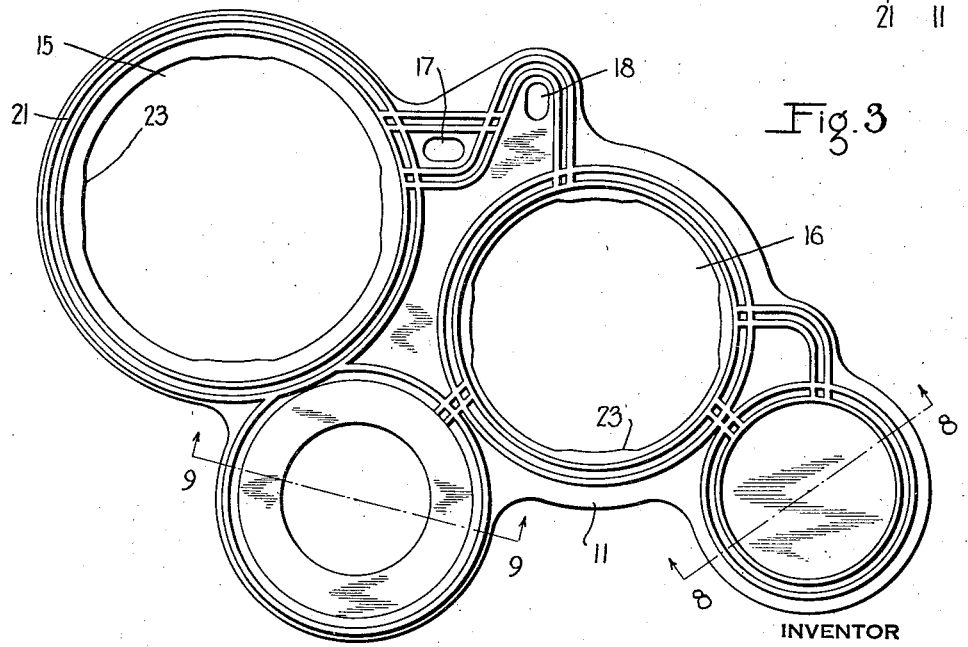
INVENTOR
PHILIP W. DEMPSEY
BY
ATTORNEY May 21, 1940.   P. W. DEMPSEY   2,201,576
METHOD OF MAKING GASKETS
Original Filed Nov. 22, 1935    3 Sheets-Sheet 2

INVENTOR
PHILIP W. DEMPSEY
BY
ATTORNEY

May 21, 1940.　　　P. W. DEMPSEY　　　2,201,576
METHOD OF MAKING GASKETS
Original Filed Nov. 22, 1935　　3 Sheets-Sheet 3

INVENTOR
PHILIP W. DEMPSEY
BY
ATTORNEY

Patented May 21, 1940

2,201,576

UNITED STATES PATENT OFFICE 2,201,576

METHOD OF MAKING GASKETS

Philip W. Dempsey, Pittsburgh, Pa., assignor to The Westinghouse Air Brake Company, Wilmerding, Pa., a corporation of Pennsylvania Original application November 22, 1935, Serial No. 51,057. Divided and this application May 12, 1938, Serial No. 207,497

5 Claims. (Cl. 154—2)

This invention relates to a method for making gaskets, particularly gaskets having different portions varying respectively in hardness and flexibility; and the present application is a division of my copending application, now Patent 2,125,334.

It is an object of my invention to provide a novel method for making gaskets.

Another object of my invention is to provide a novel method for making gaskets having different portions varying respectively in hardness and flexibility.

A further object of my invention is to provide a novel method for making the type of gasket disclosed in my above-mentioned Patent 2,125,334.

Figure 4:
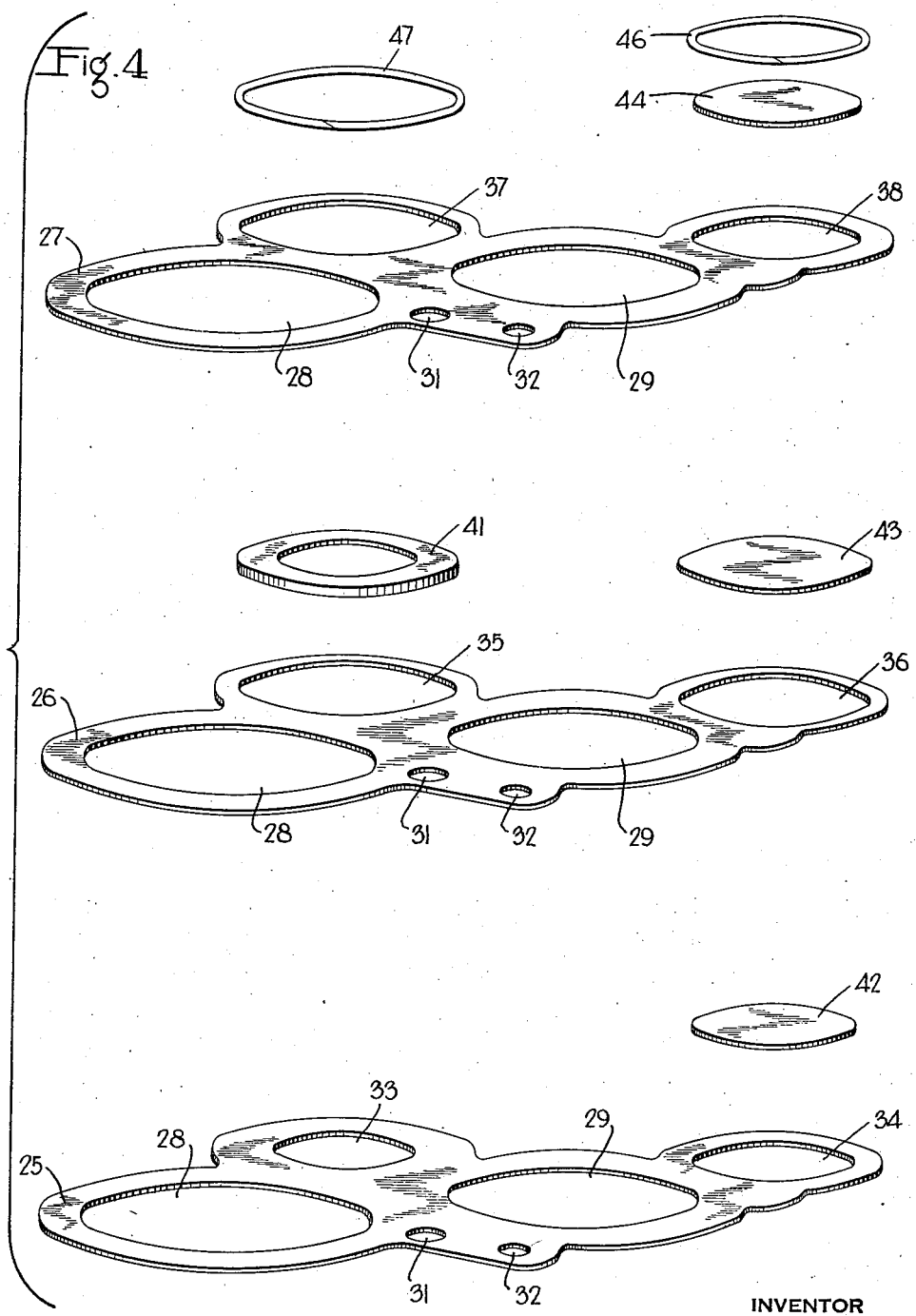

The above objects and other objects of my invention which will be made apparent hereinafter are attained in a manner subsequently to be described and illustratively shown in the accompanying drawings, wherein Figs. 1, 2 and 3 are, respectively, a plan view of one face, an elevational view, and a plan view of the opposite face of a typical gasket made according to the method of my present invention, Fig. 4 is an exploded isometric view, showing the constituent parts employed to make the gasket shown in Figs. 1, 2 and 3.

Figure 5:
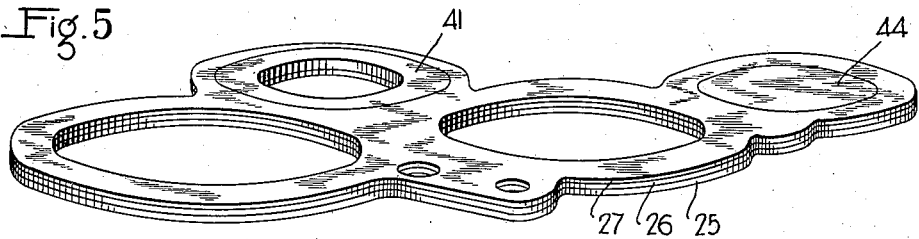
Figure 6:
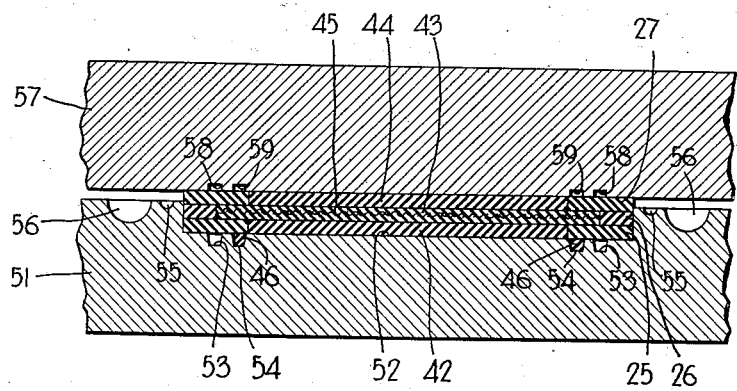
Figure 7:
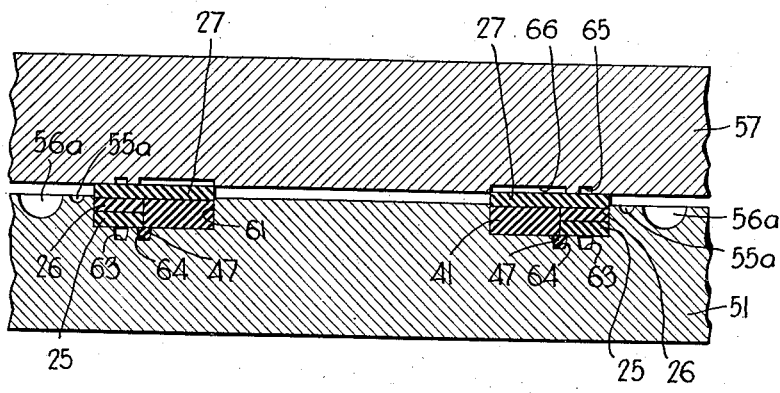
Figure 8:
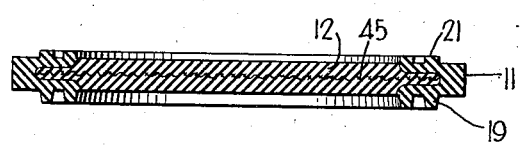
Figure 9:
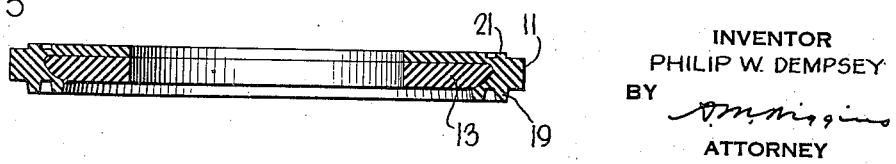

Fig. 5 is an isometric view, showing the constituent parts of the gasket in assembled relation prior to the molding and vulcanizing operation, Figs. 6 and 7 are fragmentary sectional views, showing the relation of constituent parts of the gasket in the mold prior to the application of pressure and heat, the views being taken respectively on line 8—8 and line 9—9 of Fig. 3, and Figs. 8 and 9 are fragmentary sectional views of the completed gasket, taken respectively on line 8—8 and line 9—9 of Fig. 3.

As will be seen in Figs. 1, 2 and 3, the gasket includes a gasket body portion 11 of suitable material, such as rubber, having a certain hardness and flexibility when vulcanized, a flexible diaphragm portion 12 united to the body portion 11 in a manner hereinafter described and being of material, such as rubber, softer and more flexible than the body portion when vulcanized, and a piston seat portion 13 which is united to the body portion 11 in the manner hereinafter described and which is also of material, such as rubber, softer and more flexible than the body portion 11 when vulcanized.

The body portion 11 has two openings 15 and 16 through which may extend projections on the members between which the gasket is clamped.

Additional openings 17 and 18 in the body portion 11 are provided through which bolts may extend for securing the clamping members.

The diaphragm portion 12, the piston seat portion 13, and each of the openings 15, 16, 17 and 18 are each completely surrounded by a pair of spaced sealing ribs 19 which project and taper outwardly from the face of the gasket as shown in Figs. 1 and 2.

The opposite face of the gasket is provided with so-called "phantom" beads or ribs 21 coincident with the ribs 19 but of rectangular cross-section and extending a lesser distance away from the corresponding face of the gasket than do ribs 19, in a manner and for a purpose described and claimed in the copending application Serial No. 738,492, now Patent No. 2,058,010 of Ellery R. Fitch assigned to the assignee of this application.

The gasket is provided with a plurality of projections 23 extending into the openings 15 and 16 in the manner and for a purpose taught and claimed in the copending application Serial No. 724,080, now Patent No. 2,074,746 of Ellis E. Hewitt assigned to the assignee of this application.

Further details of construction of the gasket shown in Figs. 1 to 3 when made according to the method of my present invention will be understood from the following description.

Referring particularly to Figs. 4 and 5, it will be seen that the gasket body portion 11 is made up of three layers 25, 26, and 27 of coincident contour, the layers being of substantially the same thickness and of the same material, which material when vulcanized attains the desired degree of hardness and flexibility for the gasket body 11. Each of the layers 25, 26 and 27 has corresponding perforations or openings 28, 29, 31 and 32 therein for providing the necessary openings 15, 16, 17 and 18, respectively, of the completed gasket. The one outer layer 25 also has therein an opening 33 and an opening 34. The intermediate layer 26 has therein two openings 35 and 36 adapted to register coaxially with the openings 33 and 34, respectively, in the layer 25 when the layers 25 and 26 are in coinciding superimposed relation but which are larger in size than the openings 33 and 34 of the layers 25. The outer layer 27 has therein an opening 37, which is the same size as the opening 35 of the layer 26 and which is adapted to register coaxially with the opening 35 of the layer 26 when the layer 27 is superimposed on the layer 26, and an opening 38 corresponding in size to the opening 34 in the layer 25, which opening is adapted to register coaxially with the opening 36 in the layer 26.

The diaphragm portion 12 is made up of three disc-like layers 42, 43 and 44 which correspond respectively in size to and are adapted to fit into the openings 34, 36 and 38 respectively of the several layers 25, 26 and 27. The discs 42 and 44 are constituted wholly of rubber material while the disc 43 has a layer 45 of reenforcing fabric embedded centrally therein, as indicated in Figs. 6 and 8.

The piston seat portion 13 is formed out of an annulus 41, which is substantially twice as thick as the individual layers 25, 26 and 27, and which is composed of material which when vulcanized has the desired degree of softness and flexibility for the piston seat portion 13.

The inner sealing rib 19 surrounding the diaphragm portion 12 and the inner sealing rib 19 surrounding the piston seat portion 13 are formed, respectively, out of two lengths 46 and 47 of extruded rubber material which is the same in character as the rubber material composing the layers 25, 26 and 27. The lengths 46 and 47 of extruded rubber are of relatively small circular cross-section and string-like in appearance, and are adapted to be disposed in circular grooves in the gasket mold in the manner hereinafter described. In order to enable a more ready understanding of the method of manufacture involved, the lengths 46 and 47 of extruded rubber are shown in Fig. 4 as arranged in circular form with ends overlapped, and disposed in the position which they occupy relative to the gasket layers when in the mold.

The constituent parts shown in Fig. 4 are assembled in any suitable manner into the form shown in Fig. 5. For purposes of illustration, the constituent elements or parts of the gasket may be assembled in the following manner: (1) The diaphragm disc 42 is fitted into the opening 34 in the layer 25, (2) the layer 26 is superimposed in coinciding relation on top of the layer 25, (3) the diaphragm disc 43 is fitted into the opening 36 of the central layer 26, (4) the annulus 41 is fitted into the opening 35 of the central layer 26, (5) the layer 27 is superimposed in coinciding relation on top of layer 26 with the annulus 41 extending into the opening 37 and being flush with the upper face thereof with the upper face of the layer 27, and (6) the diaphragm disc 44 is fitted into the opening 38 in the layer 27. The lengths 46 and 47 of extruded rubber are not shown in Fig. 5 inasmuch as the cooperation thereof with the gasket assembly shown in Fig. 5 is effected in the mold in the manner to be subsequently described hereinafter in connection with Figs. 6 and 7.

For simplicity, the mold wherein the gasket is formed and which comprises upper and lower portions is not completely shown in either Fig. 6 or Fig. 7, only those fragments thereof being indicated in Figs. 6 and 7 which are necessary to an understanding of the disposition of the lengths 46 and 47 of extruded rubber relative to the gasket assembly in the mold prior to the vulcanizing operation.

Referring to Figs. 6 and 7, the lower portion 51 of the mold has a recess 52 therein for receiving that portion of the gasket assembly which includes the diaphragm portion 12, the face of the recess 52 having circular grooves 53 and 54 therein which grooves are of such cross-sectional configuration as to form the desired cross-section for the sealing ribs 19.

On the inner face of the mold portion 51 and surrounding the recess 52 are a pair of concentric spaced troughs or grooves 55 and 56 which are adapted to receive the overflow of the gasket material when the gasket is subjected to pressure and heat in the mold, these grooves 55 and 56 being described and claimed in my Patent 1,910,526. On the inner face of the upper portion 57 of the mold opposite the recess 52 of the lower portion 51, are a pair of concentric circular spaced grooves 58 and 59 adapted to form the outer and inner phantom beads 21 indicated in Fig. 3.

As will be seen in Fig. 7, the lower portion 51 of the mold is also provided with an annular recess 61 for receiving therein that part of the gasket assembly shown in Fig. 5 which includes the piston seat portion 13. The surface of the recess 61 has therein a pair of concentric spaced grooves 63 and 64 for forming respectively the outer and inner sealing ribs 19 which surround the piston seat portion 13 shown in Fig. 1. Overflow troughs or grooves 55a and 56a, corresponding to the grooves 55 and 56 and surrounding the recess 61, are also provided on the inner face of the lower portion 51 of the mold. The inner face of the upper portion 57 of the mold has therein a circular groove 65 for forming the outer phantom bead 21 around the piston seat portion 13 and a relatively wide annular groove 66 inwardly concentric to the groove 65 for forming a relatively wide supporting back surface for the piston seat portion 13.

The lengths 46 and 47 of extruded rubber are first disposed in the grooves 54 and 64, respectively, of the lower portion 51 of the mold, and the gasket assembly shown in Fig. 5 is then placed in the mold with the upper face downward, it being understood that the inner face of the lower portion 51 of the mold is provided with a suitable recess, including the recesses 52 and 61, for receiving the entire gasket assembly therein.

After placing the upper portion 57 of the mold in suitable aligned cooperative relation with the lower portion 51 and securing the two portions together in any suitable manner, the mold is then subjected to suitable pressure and heat, it being understood that the inner surfaces of the upper and lower portion of the mold ultimately meet in contacting relation.

The gasket is maintained in the mold under suitable pressure and heat conditions for a suitable length of time necessary to vulcanize and unite the various parts into a unitary structure. Upon removal of the gasket from the mold, any flash or excess material extruded along the peripheral edge of the gasket may be removed in any suitable manner, as by buffing, in order to provide smooth peripheral edges for the gasket.

In the completed gasket, as shown in the sectional views of Figs. 8 and 9, it will be noted that the three gasket layers 25, 26 and 27 and the lengths 46 and 47 of extruded rubber become integrally united under the vulcanizing process as do also the three diaphragm discs 42, 43, and 44. It will be further noted by a comparison of Figs. 6 and 7 relative to Figs. 8 and 9, respectively, that the total thickness of the three diaphragm discs 42, 43 and 44, prior to the application of pressure and heat is greater than the thickness of the diaphragm portion 12 in the completed gasket, and that the thickness of the annulus 41 prior to the application of pressure and heat is slightly greater than that of the piston seat portion 13 in the completed gasket. It should therefore be understood that the material of the diaphragm discs 42, 43 and 44 and of the annulus 41 flows radially outward under the pressure and heat conditions while in the mold.

According to my invention, I provide the lengths 46 and 47 of extruded rubber and initially dispose them in the grooves 54 and 64 of the mold, in order to prevent the relatively soft rubber material of the diaphragm discs 42, 43 and 44 and of the annulus 41 from flowing into the sealing rib grooves 54 and 64 of the mold under pressure and heat conditions and thereby causing the inner sealing rib 19 surrounding the diaphragm portion 12 and the inner sealing rib 19 surrounding the piston seat portion 13 to be of relatively soft rubber instead of relatively hard rubber. Furthermore, by providing the lengths 46 and 47 of extruded rubber in the grooves 54 and 64 of the mold, the line of demarcation between the relatively hard rubber material of the body portion 11 and the relatively soft rubber material of the diaphragm portion 12 and the piston seat portion 13 is uniformly determined. This is of particular importance in connection with the diaphragm portion 12, in order to obtain uniform diaphragm characteristics.

It will be noted, additionally, in Figs. 8 and 9 that the periphery of the diaphragm portion 12 as well as the periphery of the annulus 41 is overlapped on both sides by the gasket body portion 11 and, therefore, that the diaphragm portion 12 and the piston seat portion 13 are interlockingly embedded in the gasket body portion 11, thereby preventing possible severance or separation of the diaphragm portion 12 and the piston seat portion 13 from the gasket body portion 11.

Furthermore, in view of the fact that the sealing ribs 19 and the phantom ribs 21 are on the part of the gasket body portion 11 which overlaps the periphery of the diaphragm portion 12 and the piston seat portion 13, it will be seen that when the gasket is confined between two clamping members on opposite sides thereof, the clamping force presses the sealing ribs 19 and 21, which are relatively hard, into the periphery of the diaphragm portion 12 and piston seat portion 13, which are relatively soft, and thus further serves to prevent severance or separation of the diaphragm portion 12 and piston seat portion 13 from the gasket body portion 11.

While I have disclosed a principle of construction and a method of manufacture as applied to a specific type of gasket, it should be understood that both the principle of construction and the method of manufacture disclosed herein may be employed in the construction and manufacture of other types and configurations of gaskets. It is not my intention therefore to limit the scope of my invention except as necessitated by the prior art and as defined in the appended claims.

Having now described my invention, what I claim as new and desire to secure by Letters Patent is:

1. The method of making a combined gasket and diaphragm which comprises providing three layers of a rubber material for forming the gasket body, two of said layers each having a perforation of a certain size and the third of said layers having a perforation of larger size, the perforations being so located as to coaxially register when the layers are disposed in superimposed relation, providing a plurality of layers of a rubber material for forming the diaphragm, two of the diaphragm layers having an outer contour conforming substantially to that of the perforations in the said two gasket body layers and one of the diaphragm layers having an outer contour conforming substantially to that of the larger perforation in the said third layer, assembling the gasket body layers in superimposed relation with the said third layer between the other two layers, and the diaphragm layers in corresponding superimposed relation within the perforations of the corresponding gasket body layers, disposing the assembly of layers in a mold and applying pressure and heat to effect union of the layers.

2. The method of making a combined gasket and diaphragm, which comprises forming from rubber material, of such character as to have a certain degree of hardness and flexibility in the vulcanized state, three gasket-forming blanks of the same outer contour and thickness, forming at identical locations in two of said blanks like apertures of a given diameter and forming in the third of said blanks an aperture larger in diameter than said given diameter and so located as to be coaxial with the apertures in said other two blanks when the contours of said three blanks coincide, forming from rubber material, of such character as to be softer and more flexible in the vulcanized state than that of which the gasket blanks are formed, three substantially circular diaphragm-forming blanks of substantially the same thickness respectively as the three gasket-forming blanks and having diameters corresponding respectively to the three apertures in the three said gasket-forming blanks, assembling the diaphragm-forming blanks in the corresponding apertures of the gasket-forming blanks, assembling the gasket-forming blank having the larger aperture between the two other gasket-forming blanks so that the outer contours of and the axes of the apertures in the three blanks coincide, and subjecting the assembly to pressure and heat in a mold to effect union of the several blanks into an integral unit.

3. In the manufacture of a combined gasket and diaphragm having a sealing rib closely surrounding said diaphram, the method which comprises forming from rubber material, of such character as to be relatively hard in the vulcanized state, a gasket-forming blank, forming in said gasket-forming blank a circular aperture of a given diameter, forming from rubber material, of such character as to be relatively soft and flexible in its vulcanized state, a diaphragm-forming blank having an outer contour corresponding substantially to the aperture in said gasket-forming blank, assembling the diaphragm-forming blank in the aperture of the gasket-forming blank, forming from the same rubber material as that from which the gasket-forming blank is made of sealing-rib-forming element of string-like configuration, disposing the sealing-rib-forming element in a formative groove in a mold, disposing the assembly comprising the diaphragm-forming and gasket-forming elements in the mold over the sealing-rib-forming element in a relation such that the sealing-rib-forming element circumscribes the diaphragm-forming element, and applying heat and pressure to the elements in the mold to cause union thereof into an integral unit.

4. In the manufacture of a combined gasket and diaphragm having a sealing rib closely surrounding the diaphragm, the method which comprises providing three layers of a rubber material for forming the gasket body, two of said layers each having a perforation of a certain size and the third of said layers having a perforation of larger size, the perforations being so located so as to coaxially register when the layers are arranged in superimposed relation; providing a plurality of layers of a rubber material for forming the diaphragm, two of the diaphragm layers having an outer contour conforming substantially to that of the perforations in the said two gasket layers and one of the diaphragm layers having an outer contour conforming substantially to that of the larger perforation of the said third layer; providing a string-like element of rubber material for forming the sealing rib; disposing the sealing rib element in its formative groove in a mold; assembling the gasket layers in superimposed relation with the said third layer between the other two layers and the diaphragm layers in corresponding superimposed relation within the perforations of the corresponding gasket layers; disposing the assembled layers over and in proper relation to the sealing rib element in the mold, and applying pressure and heat to effect union of the diaphragm layers to each other, union of the gasket layers to each other, union of the diaphragm layers to the gasket layers, and union of the sealing rib element to one of the gasket layers.

5. In the manufacture of a combined gasket and diaphragm having a sealing rib closely surrounding the diaphragm, the method which comprises providing three layers of a rubber material of substantially the same thickness respectively and coinciding outer contour for forming the gasket body, the rubber material of the gasket layers being of such character as to have a certain degree of hardness and flexibility in the vulcanized state, two of said gasket layers having a substantially circular perforation therein of a certain diameter and the third of said gasket layers having a substantially circular perforation therein of a diameter larger than the diameter of the perforations in the other two layers, the perforations being so located as to coaxially register when the gasket layers are assembled in superimposed relation; providing three layers of rubber material of the same thickness respectively as the gasket layers for forming the diaphragm, the rubber material of the diaphragm layers being of such character as to be softer and more flexible in the vulcanized state than the gasket layers, two of the diaphragm layers being of circular contour and diameter corresponding substantially to that of the perforations of the said two gasket layers and the third diaphragm layer being of circular contour and diameter corresponding to that of the perforation in the said third gasket layer; providing a string-like element of rubber material which is the same in character as the rubber material of the gasket layers for forming the sealing rib; disposing the sealing rib element in its formative groove in a mold; assembling said gasket and diaphragm layers by disposing each of said two diaphragm layers in the perforation of a corresponding one of said two gasket layers, disposing the said third diaphragm layer in the perforation of said third gasket layer, and disposing said layers in superimposed coinciding relation with the said third gasket layer between the said two gasket layers; arranging the assembled layers over and in proper relation to the sealing rib element in the mold, and applying pressure and heat to effect the union of the diaphragm layers, the union of the gasket layers, the union of the diaphragm layers to the gasket layers, and the union of the sealing rib element to one of said gasket layers.

PHILIP W. DEMPSEY.